Patented June 11, 1940

2,204,193

UNITED STATES PATENT OFFICE 2,204,193

RECLAIMING CATALYSTS

William E. Spicer and Rhea N. Watts, Baton Rouge, La., assignors to Standard-I. G. Company No Drawing. Application September 27, 1938, Serial No. 231,915

4 Claims. (Cl. 23—238)

The present invention is concerned with an improved process for recovery catalysts used in the hydrogenation of carbonaceous materials. The invention especially relates to a method of increasing the yields in a catalyst recovery process, in which process an extraction step is employed. The process of the present invention breaks down insoluble complex ions or hydrated compounds by a pre-treatment of the spent catalyst, followed by extracting these materials with a suitable solvent. Our invention will be fully understood from the following description which sets forth preferred methods of carrying out the same.

It is well known in the art to hydrogenate mineral oils, as for example, petroleum oils and the like and to use for this purpose various catalytic materials. These catalysts after continued use lose their activity and the catalyst constituents are recovered by various processes. In certain types of hydrogenation processes, as for example, in the hydrogenation of lubricating oils, it is the usual procedure to use a catalyst composed of oxides of the metals of groups II and VI, as for example, to use an oxide mixture comprising molybdenum tri-oxide, zinc oxide and magnesium oxide. In other types of hydrogenation processes, as for example, in the hydrogenation of Diesel fuel, it is desirable to use a catalyst selected from the sulfides of the metals of group VI, as for example, molybdenum sulfide. Thus, for example, it is often desirable to convert molybdenum tri-oxide, zinc oxide and magnesium oxide catalysts into molybdenum sulfide catalysts. This, however, has not been commercially favorable due to the fact that relatively low yields are obtained by known processes. Apparently relatively complex ions are formed which are not susceptible to treatments heretofore employed. We have now discovered a process which makes it possible to substantially fully recover the entire quantity of the group VI metallic oxide and to convert this metal into the desirable sulfide or oxide.

Our invention consists in subjecting the spent oxide mixture to a suitable pre-heat treatment, followed by extracting the treated mixture in order to dissolve the group VI metal and then converting the extracted metal to the corresponding oxide or sulfide. In this process the molybdenum tri-oxide is separated from the zinc and magnesium oxides by extraction with a suitable medium, as for example, by extraction with ammonium hydrosulfide or ammonia, followed by saturation with hydrogen sulfide. In this reaction the water-insoluble molybdenum tri-oxide is changed into soluble ammonium thiomolybdate. Molybdenum trisulfide is then precipitated from the ammonium thiomolybdate by the addition of sulfuric or hydrochloric acid. On the other hand, if a pure molybdenum oxide catalyst is desired, the mixed oxides are extracted with ammonia, which converts the molybdenum oxide into the soluble ammonium molybdate. Molybdenum tri-oxide is then precipitated from the ammonium molybdate solution by the addition of sulfuric or hydrochloric acid.

In accordance with the present process, the spent catalytic mixture is first subjected to treatment at elevated temperatures. The temperatures employed are preferably in the range from about 300° to 800° F. The temperatures, as well as the time of heat treatment, will depend upon the particular catalytic mixture being treated and upon the amount of reactivation desired, as well as upon the type of insoluble complex ions present. In general, it is preferred to subject the catalytic mixture to treatment at a temperature of above 500° F. for a period of from 4 to 6 hours. The preferred heat treatment, however, is conducted by boiling with water at a temperature above 300° F. under sufficient pressure to maintain the water in the liquid condition. Satisfactory results are also secured by roasting the spent catalyst in the presence of air or sulfur or hydrogen sulfide at a temperature in the range from 300° to 800° F. It is also possible to secure satisfactory results by pre-treating the spent catalyst with dilute acid or with acid vapors at these temperatures.

After the spent catalyst has been subjected to a heat treatment as described above, the group VI metal is then reacted with a suitable reagent such as ammonium hydroxide, ammonium sulfide, and ammonium hydrosulfide. The amount of reagent used per volume of treated catalyst will depend upon the particular reagent being used and the quantity of group VI metal to be extracted. In general, it is preferred to use from 150 to 300 cc. of reagent per 100 grams of catalyst. The temperature of extraction likewise will depend upon these factors. In general, the extraction operation is conducted at atmospheric pressure and temperature. The solution containing the extracted metal is then saturated with hydrogen sulfide, followed by the precipitation of the group VI metal by the addition of an acid, as for example, sulfuric or hydrochloric acid.

In order to further illustrate the invention, the following example is given which should not be construed as limiting the same in any manner whatsoever.

Example

An equimolar mixture of molybdenum tri-oxide, zinc oxide and magnesium oxide was extracted with a solution of ammonium hydrosulfide. A similar mixture prior to extraction with ammonium hydro-sulfide was boiled with water for 4 hours. Another similar mixture was wet with water and then heat treated with 96% of sulfuric acid. This mixture was then neutralized with ammonium hydroxide and then extracted with ammonium hydrosulfide. Another similar catalyst mixture was heated at 800° F. for approximately 4 hours and then extracted with ammonium hydrosulfide. The per cent of molybdenum tri-oxide dissolved by the respective processes may be seen by the following data:

TABLE

| Treatment | Extraction liquid | Percent of total $MoO_3$ dissolved |
|---|---|---|
| None | $NH_4HS$ | 75 |
| Boiled with water | $NH_4HS$ | 89 |
| Wet with $H_2O$ and then concentrated $H_2SO_4$; neutralized with $NH_4OH$ | $NH_4HS$ | 99.6 |
| Heated at 800° F. 4 hours | $NH_4HS$ | 99.5 |

The process of the present invention may be widely varied. Although it is preferred to pretreat the metallic oxide of group VI prior to extraction by heating at about 800° F., the other high temperature treatments are satisfactory.

The process of the present invention is not to be limited by any theory or mode of operation, but only by the following claims.

We claim:

1. A method of recovering molybdenum compound from spent catalyst containing molybdenum oxide, zinc oxide and magnesium oxide which comprises digesting the spent catalyst mass with boiling water at a temperature above 300° F. and below 800° F. while under a pressure sufficient to raise the boiling point of said water to the digestion temperature, for an extended period of the order of 4 hours or more, thereafter extracting the mass with an ammoniacal solution to form a soluble molybdate and thereafter precipitating the molybdenum compound from said solution.

2. The method defined in claim 1 wherein the ammoniacal solution is ammonium hydroxide.

3. The method defined in claim 1 wherein the ammoniacal solution is ammonium hydrosulfide.

4. The invention defined in claim 1 wherein the ammoniacal solution comprises ammonium sulfide.

WILLIAM E. SPICER.
RHEA N. WATTS.